United States Patent [19]
Harris

[11] Patent Number: 6,061,080
[45] Date of Patent: May 9, 2000

[54] APERTURE FOR MULTIPLE REFLECTION RASTER OUTPUT SCANNING SYSTEM TO REDUCE BOW

[75] Inventor: Ellis D. Harris, Claremont, Calif.

[73] Assignee: Xerox Corporation, Stamford, Conn.

[21] Appl. No.: 09/016,548

[22] Filed: Jan. 30, 1998

[51] Int. Cl.⁷ .................................................. G02B 26/08
[52] U.S. Cl. .................... 347/243; 347/241; 347/256; 347/259; 359/196; 359/212
[58] Field of Search ................................. 347/233, 241, 347/243, 244, 256, 259; 359/196, 208, 212, 215, 223, 225

[56] References Cited

U.S. PATENT DOCUMENTS

| | | | |
|---|---|---|---|
| 5,475,524 | 12/1995 | Harris | 359/216 |
| 5,491,578 | 2/1996 | Harris | 359/208 |
| 5,512,949 | 4/1996 | Fisli et al. | 347/259 |
| 5,517,330 | 5/1996 | Maeda | 358/481 |

*Primary Examiner*—N. Le
*Assistant Examiner*—Hai C. Pham
*Attorney, Agent, or Firm*—William Propp

[57] ABSTRACT

An aperture and a field lens are positioned between the collimator and the rotating polygon mirror of a multiple reflection, multiple beam raster output scanner to eliminate differential scan line bow. The aperture and the field lens will be positioned where the multiple beams cross the optical axis of the raster output scanner optical system. The multiple beams are telecentric.

6 Claims, 5 Drawing Sheets

APERTURE FOR MULTIPLE REFLECTION RASTER OUTPUT SCANNING SYSTEM TO REDUCE BOW

BACKGROUND OF THE INVENTION

This invention relates generally to a multiple beam raster output scanning system and, in particular, to bow compensation in multiple reflection multiple beam raster output scanning systems. Multiple reflection multiple beam raster output scanning systems use multiple reflections between the facet of the rotating polygon mirror and a second mirror for passive facet tracking and scan angle doubling.

Prior art FIG. 1 shows a known rotating polygon multi-beam raster outputs scanner (ROS). The functions described below equally apply to most rotating polygon scanning systems, independently of number of light sources used.

FIG. 1 shows a pair of sagittally offset laser diodes 31 and 32. The beams 41 and 42 emitted by laser diodes 31 and 32 are collimated by the collimator 33 (lens L1). A sagittal aperture 34 is placed in the position where the beams 41 and 42 cross the optical axis, to control the F/#, which in turn controls the spot size. The input cylinder optical element 35 (lens L2) focuses the beams 41 and 42 on the surface of the current polygon facet 36 of the rotating polygon. After reflecting from the current facet 36, the beams 41 and 42 pass through the F-theta lens 37 (lens L3). The F-theta lens 37, in general, has relatively low power in the tangential meridian. The main function of the F-theta lens 37 is to provide focusing in the tangential meridian and control the scan linearity, in terms of uniform spot displacement per unit angle of polygon rotation.

The function of the motion compensating optical element (MCO) 39 is to reimage the focused beams 41 and 42 from the polygon facet 36 onto the Photoreceptor (PR) plane 40 at a predetermined position, independently of the polygon angle error or tilt of the current facet 36. Such compensation is possible because the focused beams are stationary "objects" for the F-theta lens 37 and the MCO 39. Although, due to polygon tilt, or wobble, the beams 41 and 42 are reflected to different positions of the post-polygon optics aperture for each different facet of the rotating polygon, the beams 41 and 42 are imaged to the same position on the PR plane 40.

In rotating polygon, single spot ROS-based xerographic copiers and printers, bow distortions occur from the accumulation of optics tolerances. Bow itself is the curved line described by the scanned laser beam of the ROS as it moves in the fast scan direction. Thus, the bow appears as a displacement of a scan line in the process direction as the line extends in the fast scan direction.

Although multi-beam, laser diode based ROS provides high quality, high throughput xerographic printing, differential scan line bow remains as an undesirable side affect. Differential scan line bow arises from the very nature of multi-beam optical systems, where the beams are offset sagittally (in the cross-scan direction) so that half of the beams lie above and half of the beams lie below, or all of the beams lie above or below, the optical axis.

Depending on the design of the system, the differential scan line bow can cause the scan lines to move toward each other (barrel distortion), or away from each other (pin cushion distortion). In both of these cases, the light sources (lasers) are placed on opposite sides of the optical axis. Therefore, the centers of curvature of the bowed scan lines are also on opposite sides of the optical axis. If all light sources are placed on one side of the optical axis, then all of the scan lines will be imaged on the opposite side of the optical axis. Therefore, the centers of curvature of all of the bowed lines will also lie on same side of the axis. However, each line will be bowed at a different radius of curvature. This is the source of another type of differential bow.

FIGS. 2 to 5 show the various types of errors which can be introduced by differential scan line bow. In FIG. 2, the ideal scan line 50 is shown as a dashed lines. The first bowed scan line 53 has a first radius of curvature which is different from the radius of curvature of the second bowed scan line 54.

In FIG. 3, a third bowed scan line 56 is superimposed over the first bowed scan line 52. As shown in FIG. 3, the third bowed scan line 56 has a center of curvature which is on the opposite side of the ideal scan line 50 from the center of curvature of the first bowed scan line 52.

In FIG. 4, the center of curvatures of bowed scan lines 51 and 53 are located on the opposite side of ideal scan line 50 in such a fashion that the bowed scan lines create a pincushion distortion. This occurs whether the bowed scan lines 51 and 53 have the same or different radius of curvature.

In FIG. 5, the center of curvatures of bowed scan lines 55 and 57 are also on the opposite side of ideal scan line 50 (with same or different radii) but their arrangement with relation to each other is such that they form a pincushion distortion. Again, this occurs whether the bowed scan lines 55 and 57 have the same or different radii of curvature.

In general, in the first order, all of these distortions in the prior art systems are generated by the considerable angular deviation between the output chief rays and the system axis, as shown in FIG. 1.

In single-beam monochrome or single-beam multiple pass color printing systems, a few hundred microns of bow causes no noticeable degradation in the image quality because the bow of the successive scan lines is identical. However, in multiple beam, monochrome, single-station printing systems, or in multiple beam, single-pass color printing systems with single or multiple photoreceptor stations, differential bow causes gross misregistration on the photoreceptor(s) both in the single monochrome image and also among the color layers in the multi-layer color image.

In particular, this misregistration can occur because the magnitude and the earlier described different orientation of the differential bow.

Multiple reflection ROS use multiple reflections between the facet of the rotating polygon mirror and a second mirror for passive facet tracking and scan angle doubling.

As taught in U.S. Pat. No. 5,475,524, commonly assigned as the present application and herein incorporated by reference, scanner performance is determined by the physical limitations on the speed at which the polygon mirror is rotated, by the angular deflection of the laser beam achieved by reflection from a facet from the rotating polygon, the number of facets, the size of the facets, and the width of the beam being scanned where it is incident upon the rotating polygon mirror.

The beam width impacts the scanning speed because it determines the minimum facet size of a facet on the rotating polygon mirror. A larger facet means a larger rotating polygon and hence larger, more costly, motor polygon assemblies with higher power motors and slower scanning speeds. Scanning speeds, for a given beam width, can be increased by the use of facet tracking devices because they allow a smaller facet to be used and therefore smaller rotating polygon mirrors which can be rotated faster.

One method for increasing scanning speeds is the use of angle doubling with small sized polygon assemblies having a large number of small sized facets. For an F-theta scan lens, commonly employed in laser ROS, the scanned distance on the photoreceptor is the product of the scan angle (theta) and the effective focal length (f). Whenever the scan angle can be increased, the effective focal length can be decreased for a given scan length. A decrease in the effective focal length brings two primary advantages. Firstly, the smaller focal length translates directly into a smaller physical casting or base upon which the optical components are mounted. Glass lens elements, mirrors and all other components can be smaller. The end result is a smaller, lighter, less costly product. Secondly, the shorter focal length requires a smaller beam at the rotating polygon mirror, further reducing the sizes of the optical and mechanical components.

A further advantage results from scan angle doubling in that any given scan distance along the photoreceptor can be achieved with only half the polygon angular rotation. By this means, the polygon speed of rotation is significantly reduced, allowing lighter, smaller and less costly motor bearings as well as better bearing lifetime and overall performance.

To be free from differential scan line bow, a laser beam approaching the photoreceptor plane can have no cross-scan component to its propagation direction vector. This condition is easily achieved for a single beam ROS. One method for elimination differential scan line bow in a multiple beam ROS is to make the multiple beams telecentric, i.e. parallel to the optical system axis, as taught in U.S. Pat. No. 5,512,949, commonly assigned as the present application and herein incorporated by reference.

However, in a multiple beam, multiple reflection ROS for facet tracking and scan angle doubling, providing telecentric beams alone is not sufficient to compensate for differential scan line bow.

It is an object of the present invention to provide optical means to compensate for differential scan line bow in a multiple beam, multiple reflection ROS for facet tracking and scan angle doubling.

SUMMARY OF THE INVENTION

Accordingly, this invention provides for an aperture and a field lens are positioned between the collimator and the rotating polygon mirror of a multiple reflection, multiple beam raster output scanner to eliminate differential scan line bow. The aperture and the field lens will be positioned where the multiple beams cross the optical axis of the raster output scanner optical system. The multiple beams are telecentric.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
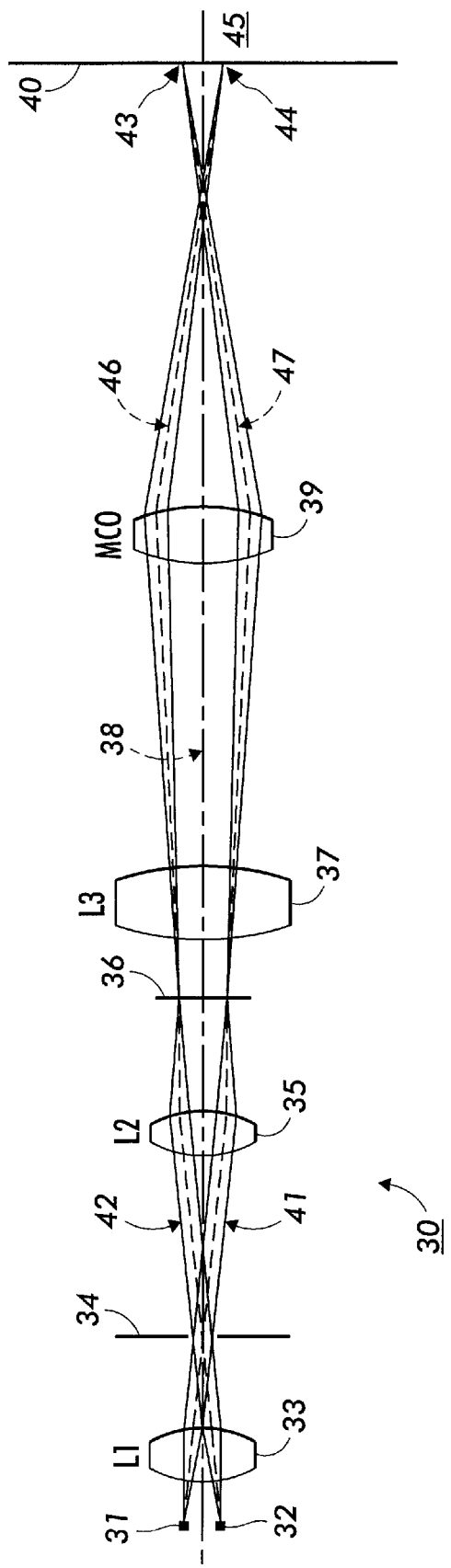
FIG. 1 shows the block diagram of a typical prior art polygon optical system.
Figure 2:
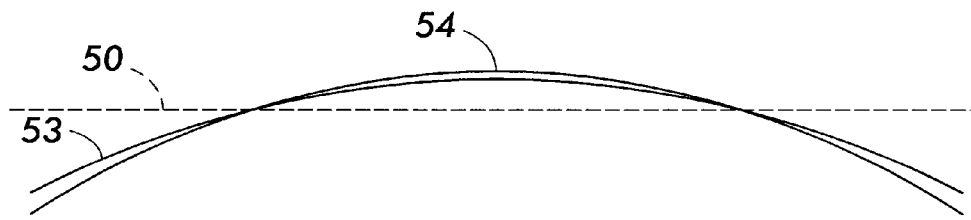
FIG. 2 shows a pair of bowed scan lines having the center of curvatures on the same side of the optical axis but with different radii of curvatures.
Figure 3:
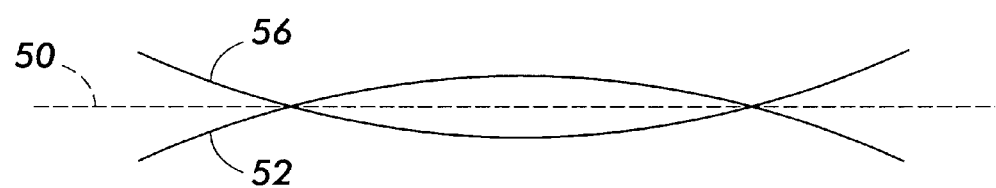
FIG. 3 shows a pair of bowed scan lines having centers of curvature on opposite sides with same or different radii.
Figure 4:
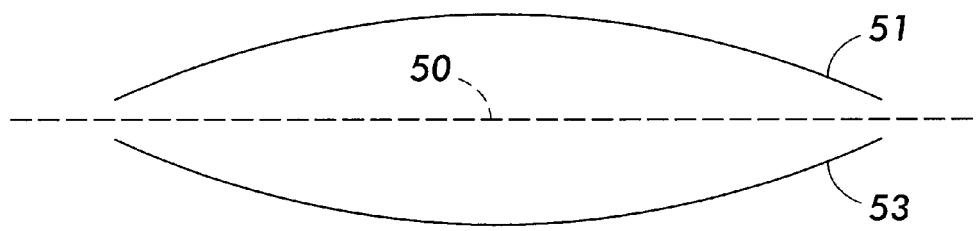
FIG. 4 shows a barrel distortion between a pair of bowed scan lines having centers of curvature on opposite sides with same or different radii.
Figure 5:
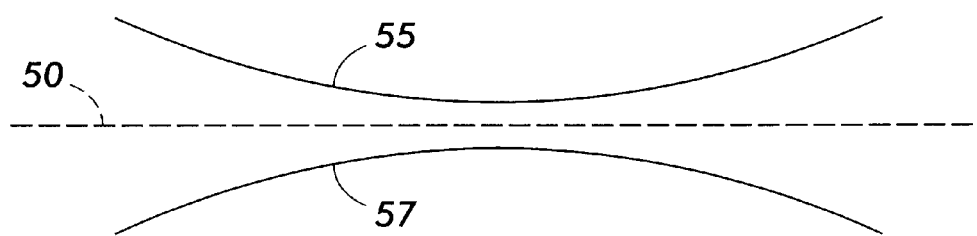
FIG. 5 shows a pin-cushion distortion between a pair of bowed scan lines having centers of curvature on opposite sides with same or different radii.
Figure 6:
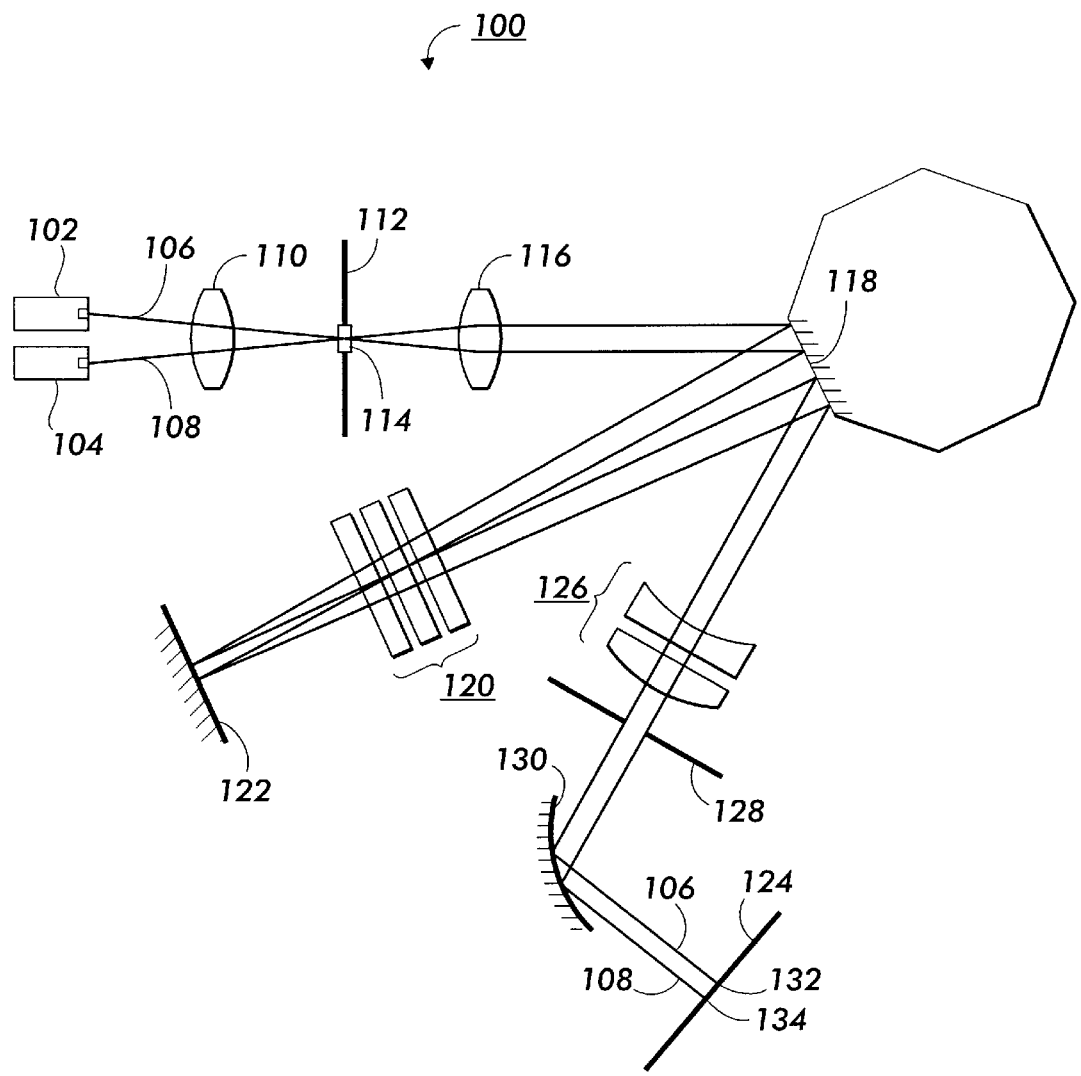
FIG. 6 shows a schematic view of a multiple reflection, multiple beam raster output scanning system with an aperture and field lens for compensating for differential scan line bow of the present invention.
Figure 7:
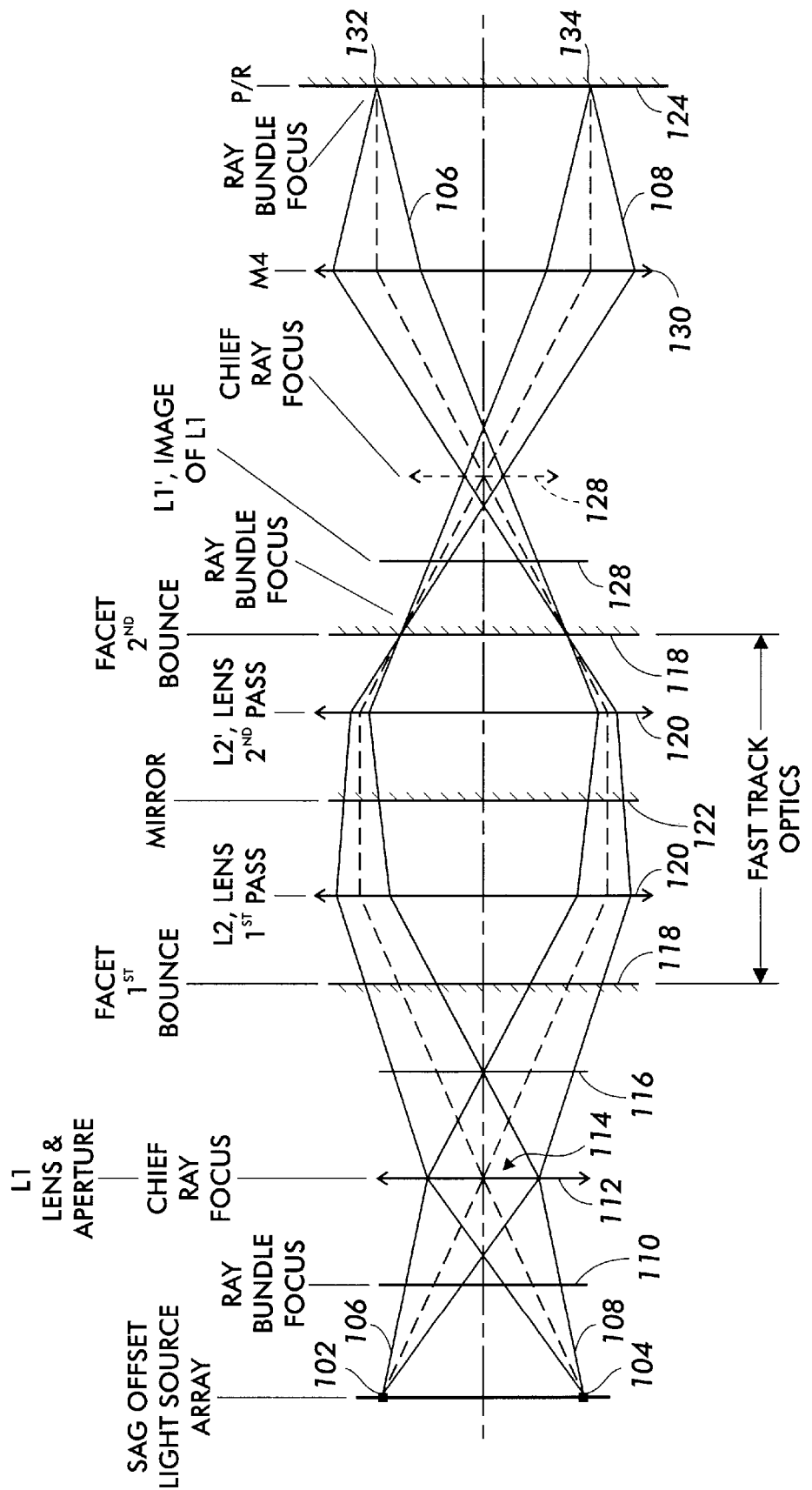
FIG. 7 shows the block diagram of the multiple reflection, multiple beam raster output scanning system of FIG. 6.

Reference is now made to the schematic view of FIG. 6 and the block diagram view of FIG. 7, wherein there is illustrated a multiple reflection, multiple beam raster output scanning system 100 as an embodiment of the present invention.

As shown in FIGS. 6 and 7, the optical system 100 comprises a pair of laser diodes 102 and 104, which emit a pair of laser beams 106 and 108, respectively. The optical system 100 is equally applicable to systems having three or more laser diodes and laser beams. In case of odd number of lasers, the center laser is located on the sagittal optical axis.

Each laser diode 102 and 104 can emit its light beam at a wavelength different from the wavelength of the light beam emitted by the other laser diode.

The laser beams 106 and 108 first pass through the collimator 110 (lens L1) and cross at the aperture 112 and field lens 114, as best seen in FIG. 7. The laser beams 106 and 108 then pass through the input cylindrical lens 116 (lens L2) and are focused onto the polygon facet surface 118.

The multiple reflections of the passive facet tracking system are next. The polygon facet surface 118 reflects the beams 106 and 108 through passive facet tracking optics 120 to a plane mirror 122.

The plane mirror 122 reflects the beams 106 and 108 back through the passive facet tracking optics 120 to the polygon facet surface 118. The polygon facet surface 118 then reflects the beams 106 and 108 out towards post scanning optics and the photoreceptor. The rotation of the polygon facet surface causes the laser beams 106 and 108 to be scanned across the photoreceptor plane 124.

After being reflected the second time by the polygon facet surface 118, the laser beams 106 and 108 pass through the F-theta scan lens 126 (lens L3) and again cross at the image of the sagittal aperture stop 128. This is also the back focal plane of the anamorphic motion compensating optic (MCO) 130. It should be noted that in this case, the image of the sagital aperture stop is not only in front of the photoreceptor plane 124, but is also in front of the MCO 130. The MCO 130 comprises a cylindrical lens or cylindrical mirror.

After passing through (or reflected by) the MCO 130, the laser beams 106 and 108 are focused onto the photoreceptor plane 110 to form the scanning spots 132 and 134. The chief exit rays of the laser beams 106 and 108 are parallel to the system axis 136. That is, the chief exit rays are telecentric.

The focal length and position of the collimator lens 110 is chosen such that the aperture plane (where the chief rays cross each other) is imaged in the back focal plane of the MCO 130. Because of this condition, the MCO will refract the chief rays parallel with the system axis that is common to all of the optical elements. Thus, a telecentric system is created. In the present invention, the combined power of the F-theta lens 126 and the MCO continues to refocus the spots of the laser beams on the photoreceptor from the polygon plane into the photoreceptor plane. At the same time, the MCO alone looks at the image of the sagital aperture stop that is located in its back focal plane as an object. Because of this, the MCO refracts the chief rays parallel along the system axis. The MCO thus creates the favorable conditions required for scan lines free of differential bow, large depth of focus, and low scan line motion due to polygon error tilt. In general, the chief exit ray of each light beam of the system should be parallel to the system axis within 0.1 degree. However, the chief exit ray of a light beam can be within 1 degree of parallel and still be considered telecentric.

The cross-scan component of the multiple scanning beams is eliminated by the use of an aperture and field lens, after the collimator but before the first reflection from the facet of the rotating polygon mirror, which eliminates differential scan line bow at the scan line in the photoreceptor plane.

The chief rays from the multiple beams 106 and 108 cross the optical axis between the collimator 110 and the facet surface 118 of the rotating polygon mirror. The aperture 112 and field lens 114 are positioned between the collimator 110 and the facet surface 118 of the rotating polygon mirror, at the point where the chief rays from the multiple beams cross the optical axis, to eliminate the cross-scan component of the multiple scanning beams.

The multiple reflection optics needed for facet tracking which relay the light beams back onto the facet in the scan plane also are utilized to achieve the required functions in the cross-scan plane. Thus, the field lens 114, along with the coincident beam size control aperture 112, are imaged by the multiple reflection optics onto the required point of chief ray cross between the facet and the photoreceptor. The rays from each light source which pass through the aperture center are, by definition, the chief ray set. These rays will then proceed through the optical system optics with no cross-scan component of propagation velocity, the condition for no differential scan line bow.

With the field lens positioned at the aperture, the lens will have no focusing effect on the chief rays but the lens can be used to image each point light source upon the polygon facet at the final facet reflection. The normal scan optics then brings these point sources to a further image upon the photoreceptor.

Differential scan line bow is eliminated in a multiple reflection, multiple beam ROS by using telecentric multiple beams and an aperture and field lens between the collimator and the polygon facet. Alternatively, the differential scan line bow can be compensated for by just using the telecentric multiple beams and an aperture without the field lens between the collimator and the polygon facet.

The pre-polygon optics and the facet tracking, multiple reflection optics can be a multiple element lens group or an aspheric element. In general, they will be anamorphic in that the optics perform different functions in the scan and cross-scan planes. In common with earlier multiple beam ROS, where the spot size and line spacing require different magnifications, the cross-scan optical magnification is set by scan line spacing. Spot size is then controlled by the aperture.

As shown in U.S. Pat. No. 5,475,524, the multiple reflection optics of mirror and lens are changed from facet tracking to scan angle doubling. The use of multiple telecentric light beams and an aperture and field lens between the collimator and the polygon facets also eliminates differential scan line bow in the multiple reflection ROS with scan angle doubling.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. A raster output scanner optical system for a printing apparatus, the optical system comprising:

a light emitting device for emitting multiple light beams, said multiple beams being telecentric with the optical axis of said raster output scanner optical system;

a photoreceptor;

a rotating polygon mirror with multiple reflective facets for scanning each of said multiple light beams along the photoreceptor;

an input optical system including collimating means for collimating and focusing each of said multiple beams onto one of said multiple reflective facets of said rotating polygon mirror;

a multiple reflection optical system for reflecting each of said multiple light beams from said one of said multiple reflective facets back to said one of said multiple reflective facets for scanning each of said multiple light beams along the photoreceptor;

an output optical system comprising an F-theta optical element and a motion compensation optical element for focusing each of said multiple light beams from said one of said multiple reflective facets along the photoreceptor; and an aperture and lens between said collimating means and said rotating polygon mirror positioned where said multiple beams cross said optical axis for eliminating differential scan line bow of said multiple beams at said photoreceptor.

2. The raster output scanner optical system of claim 1 wherein said multiple reflection optical system provides facet tracking optical elements.

3. The raster output scanner optical system of claim 2 wherein said multiple reflection optical system includes a lens element and a mirror.

4. The raster output scanner optical system of claim 2 wherein each of said multiple light beams are at a different wavelength.

5. The raster output scanner optical system of claim 1 wherein said multiple reflection optical system provides scan angle doubling optical elements.

6. The raster output scanner optical system of claim 5 wherein said multiple reflection optical system includes a lens element and a mirror.

* * * * *